(12) United States Patent
Schaake

(10) Patent No.: US 6,607,432 B2
(45) Date of Patent: Aug. 19, 2003

(54) AIR DUCT

(75) Inventor: Norman Schaake, Bad Rodach (DE)

(73) Assignee: Valeo Klimasysteme GmbH, Rodach (DE)

(*) Notice: Subject to any disclaimer, the term of this patent is extended or adjusted under 35 U.S.C. 154(b) by 0 days.

(21) Appl. No.: 10/096,109

(22) Filed: Mar. 13, 2002

(65) Prior Publication Data

US 2002/0129863 A1 Sep. 19, 2002

(30) Foreign Application Priority Data

Mar. 13, 2001 (DE) .......................... 101 12 010

(51) Int. Cl.⁷ .................................. B60H 1/00
(52) U.S. Cl. ............... 454/143; 454/906; 181/224
(58) Field of Search .................... 454/906, 143, 454/270; 181/224

(56) References Cited

U.S. PATENT DOCUMENTS

| | | | | |
|---|---|---|---|---|
| 2,676,678 A | * | 4/1954 | Jacobson | 454/185 |
| 2,704,504 A | * | 3/1955 | Wilkening | 454/195 |
| 2,820,406 A | * | 1/1958 | Argentieri | 454/284 |
| 3,452,667 A | * | 7/1969 | Coleman et al. | 454/324 |
| 4,287,962 A | * | 9/1981 | Ingard et al. | 181/224 |
| 4,872,398 A | * | 10/1989 | Shen | 454/346 |
| 5,836,813 A | * | 11/1998 | Miyata et al. | 454/139 |
| 6,283,245 B1 | * | 9/2001 | Thurman et al. | 181/224 |
| 6,342,005 B1 | * | 1/2002 | Daniels et al. | 454/338 |

FOREIGN PATENT DOCUMENTS

| | | |
|---|---|---|
| DE | 3535152 A1 | 4/1986 |
| DE | 41 04 965 C2 | 8/1992 |
| DE | 197 15 961 C2 | 10/1998 |
| EP | 0 968 857 A1 | 1/2000 |
| JP | 03122447 A | 5/1991 |
| JP | 10073304 A | 3/1998 |

OTHER PUBLICATIONS

VDI–Richtlinien, VDI 2081, Mar. 1983, S. 13–15; insbes. Pkt 7.3.

* cited by examiner

Primary Examiner—Derek Boles
(74) Attorney, Agent, or Firm—Liniak, Berenato & White

(57) ABSTRACT

An air duct, in particular for a motor vehicle heating, ventilating and/or air conditioning system, which is acoustically optimized by virtue of the fact that at least one cross-sectional discontinuity is constructed by making use of a phenomena which occur as acoustic scattering processes at the cross-sectional discontinuity. The cross-sectional discontinuity should extend substantially perpendicular to the flow direction in the air duct.

11 Claims, 4 Drawing Sheets

AIR DUCT

BACKGROUND OF THE INVENTION

1. Field of the Invention

The present invention relates in general to an air duct and, in particular, to an air duct in a motor vehicle heating, ventilating and/or air conditioning system.

2. Description of Related Art

Air ducts are widely applied in the motor vehicle industry, inter alia, in order, for example, to guide air driven by a blower through a heating, ventilating and/or air conditioning system and, subsequently, towards outlets, for example in the region of the dashboard of the vehicle. In addition to noises which originate from the drive device of the blower, the blower wheel itself, or even the vehicle engine, unpleasant noises frequently arise in the air ducts for the vehicle occupants, in particular when the air speed is high. So far, it has been assumed that a duct wall as smooth and continuous as possible is to be provided in order to avoid noises.

Furthermore, use has been made from time to time of what are termed Helmholtz resonators, which render it possible to reduce acoustic vibrations of a specific frequency. Thus, for example, EP-A-0968857 proposes a heating and/or air conditioning system for a motor vehicle with improved acoustic performance, in which are provided at specific locations, at which noises arise particularly frequently, for example, in the transition region of two abutting air ducts, or at locations at which the direction of the moving air is sharply changed, Helmholtz resonators which are to be designed specially for the specific frequency of the sound waves there. Such Helmholtz resonators usually comprise a cavity that is constructed at the duct wall and is separated from the air duct with the exception of exactly constructed small openings.

Alternatively, it is also possible to provide damping materials, for example in the form of foamed plastic, in the opening region of the cavities. When designing such resonators, it continues to be important in any case to influence the flow properties in the bordering air duct as little as possible. Moreover, Helmholtz resonators can contribute to reducing the sound waves present only at a specific frequency, and so it is only individual peaks in the overall frequency spectrum that are sharply variable both as a function of the equipment and as a function of the state that can be reduced.

A further disadvantage of what are termed Helmholtz resonators is to be seen in that not only are the design and construction complex, but the production also involves substantial additional costs, since virtually closed cavities at duct walls cannot be provided easily by injection-moulding technology.

Consequently, there has long been a need for an acoustically improved air duct which can reduce sound waves occurring over as broad a band as possible, and yet is to be relatively easy to design and, above all, easy to produce.

SUMMARY OF THE INVENTION

It is therefore the object of the present invention further to develop an air duct known per se, in particular in a motor vehicle heating, ventilating and/or air conditioning system, in such a way that it is of simple design and easy to produce and can at least partially reduce or eliminate the occurrence of undesired sound frequencies over a wide band.

According to the invention, this object is achieved by virtue of the fact that at least one cross-sectional discontinuity is constructed in the case of a known air duct. Specifically, it has been shown surprisingly that contrary to the previous attempts to provide duct walls that are as continuous and smooth as possible, the construction of a cross-sectional discontinuity can contribute to reducing the development of noise and to damping already existing sound waves over a wide band by making use of phenomena which occur as purely acoustic scattering processes at the cross-sectional discontinuity. The cross-sectional discontinuity should extend substantially perpendicular to the flow direction in the air duct. In the case of particularly simple embodiments, the cross-sectional discontinuity is therefore provided substantially perpendicular to the air duct, although more complex shapes which take account of the flow profile in the air duct are also possible such as, for example, a parabolic shape. Different air duct geometries can therefore lead to different cross-sectional discontinuities.

An embodiment particularly advantageous in terms of production engineering can be achieved by constructing the cross-sectional discontinuity by means of a cross-sectional enlargement of the air duct. It is possible thereby to scatter the incoming sound waves of medium to higher frequency at the cross-sectional discontinuity, the sound pressure at the higher frequencies being lowered by interference and damping of higher modes.

In many applications, it is desired for the air duct to have virtually the same cross section at the inlet and outlet ends, and so it can be advantageous that the cross-sectional discontinuity is constructed as an edge of a cavity bordering the air duct. For example, it is possible to provide such a cavity by local thermoforming of the duct wall. Alternatively, it is also possible for such an air duct with bordering cavity to be injection-moulded, since, by contrast with known Helmholtz resonators, the cavity in the air duct opens over a wide area, in particular virtually over its entire extent.

In a preferred embodiment, the cross-sectional discontinuity is constructed at the end of a projection, for example a duct wall projection, which projects into a cavity bordering the air duct. Additional interferences can be utilized for the purpose of noise damping owing to the construction of the cross-sectional discontinuity on a projection. In a particularly preferred embodiment, the projection is substantially aligned with the bordering air duct wall, other configurations such as, for example, inclined inwards into the cavity, possibly being advantageous, however, depending on application.

The cross-sectional discontinuity is advantageously constructed substantially in the middle in a wall of the air duct, since the flow rate is mostly highest there, it also being possible to encounter or represent resonance phenomena and interference more frequently in the middle of the air duct.

It is preferred, furthermore, that the cross-sectional discontinuity extends over at least 50% of the width of the air duct, in particular substantially over the entire width. In any case, the dimensions of the cross-sectional discontinuity should not be too small, in order to avoid the production of whistling noises, which would diametrically oppose the aim of the present invention.

In a preferred embodiment, the cross-sectional discontinuity is optimized with reference to possible turbulences at a separation edge of an air approach surface, and/or an air approach edge is optimized, such that no, or scarcely any instances of turbulence arise in the case of shear layers set up, or when the flow is once again applied to the original dimension of the duct. For example, by rounding the edges it is possible to effect/support a deflection of the air downstream of/at the cross-sectional discontinuity into the duct, or else into the cavity.

Finally, it is preferred that a plurality of cross-sectional discontinuities are provided which are of different width, of different construction and/or with bordering cavities which are differently dimensioned/constructed. It is thereby possible to avoid the sound components, particularly in the medium frequency band from 1000 Hz to 5000 Hz, since the incoming sound waves of medium to higher frequencies are scattered at the respective cross-sectional discontinuities. Various instances of interference and damping of higher modes can lower the sound pressure at the higher frequencies owing to the variability of the plurality of cross-sectional discontinuities and/or the bordering cavities.

BRIEF DESCRIPTION OF THE DRAWINGS

Further advantages and features of the present invention emerge from the following description, given merely by way of example, of a few currently preferred embodiments which refer to the attached drawings in which.

DETAILED DESCRIPTION OF PREFERRED EMBODIMENT

Figure 1A:
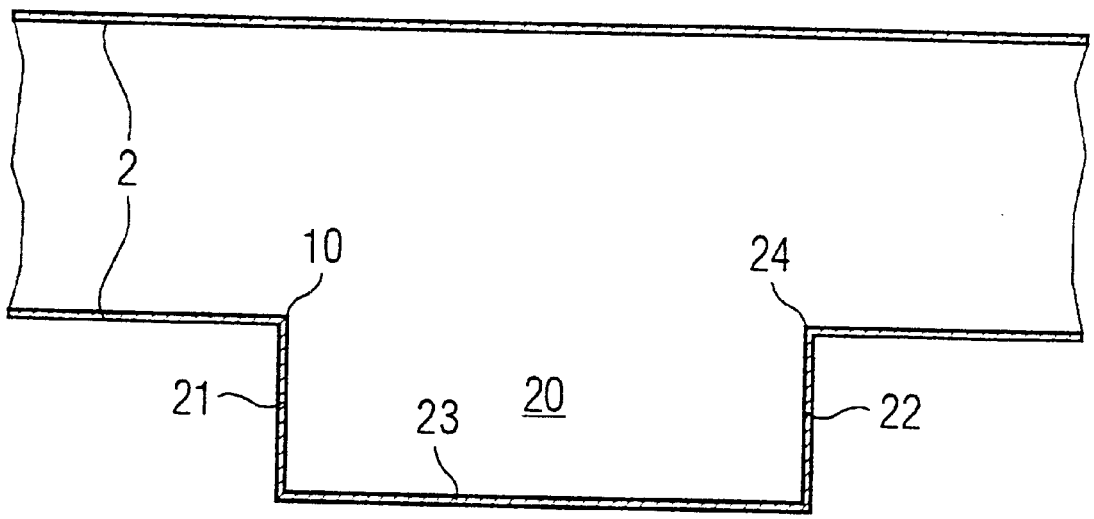
FIGS. 1a and 1b show two orthogonal sections of an air duct as preferred embodiment of the invention.

FIG. 1a shows in the top part a diagrammatic sectional view of an air duct as a preferred embodiment of the present invention. The air duct has a duct wall 2, which can, for example, define a rectangular cross section. At the reference numeral 10, a cross-sectional discontinuity is provided by an edge which defines a cavity 20 in addition to the volume of the air duct. In the sectional view shown, the cavity 20 has a substantially rectangular shape which is defined by a side wall 21, which adjoins the edge 10, a bottom wall 23 and a wall 22 which brings the cross section back to the dimension of that obtained before the cross-sectional discontinuity. The transition between the wall 22 and the duct wall defines an edge 24. As may be seen in the diagrammatic illustration of FIG. 1, there is thus a symmetrical configuration which provides a corresponding reduction in noise independently of the flow direction. However, it is to be assumed below that air enters the air duct on the left-hand side and leaves it on the right-hand side.

The air entering the air duct at a specific speed brings with it a certain sound spectrum which is to be reduced according to the invention over a wide band. As soon as the air reaches the cross-sectional discontinuity 10, the incoming sound waves of medium to higher frequencies are scattered at the cross-sectional discontinuity. The sound pressure at the higher frequencies is lowered by interference and damping of higher modes. The cavity 20 can be planned as early as during the design and, since there are no undercuts in the case of the embodiment shown in FIG. 1, this air duct can be produced in one piece with particular ease by thermoforming the duct wall, or else using injection-moulding technology.

Figure 1B:
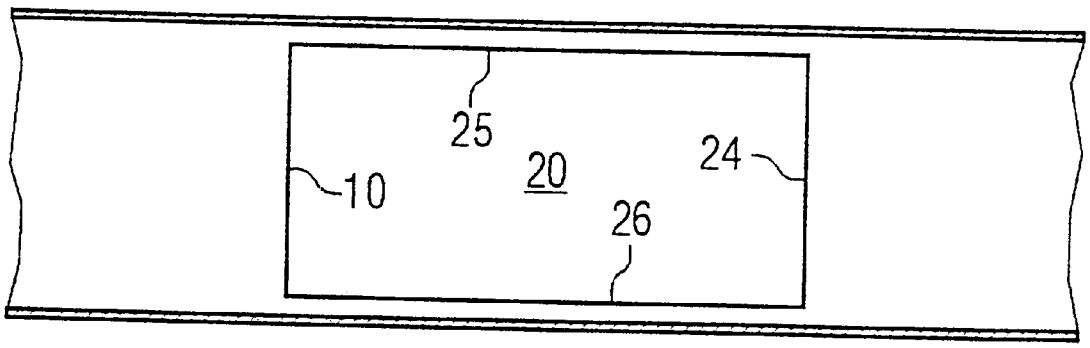

As can be seen from FIG. 1b, in the embodiment shown here the cross-sectional discontinuity 10 extends virtually over the entire width of the duct, as also does the cavity 20 adjoining it. It should be mentioned that the shape of the cavity can also not be rectangular in top view. For example, it is possible for the cavity 20 to taper in the flow direction, or else widen out if a lesser width is envisaged for the cross-sectional discontinuity.

Figure 2A:
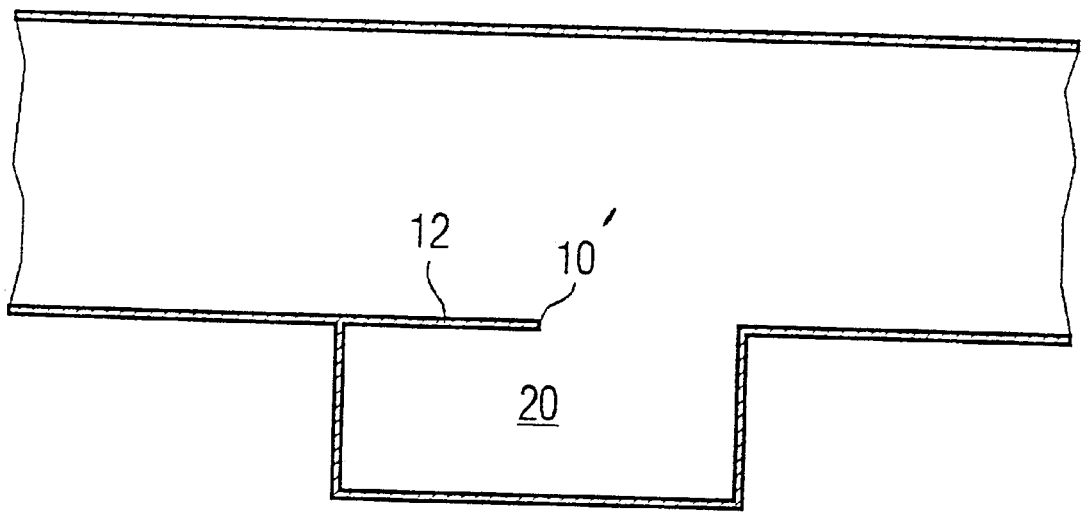
FIGS. 2a and 2b show two orthogonal sections of an air duct as an alternative embodiment in a view analogous to FIGS. 1a and 1b.
Figure 2B:
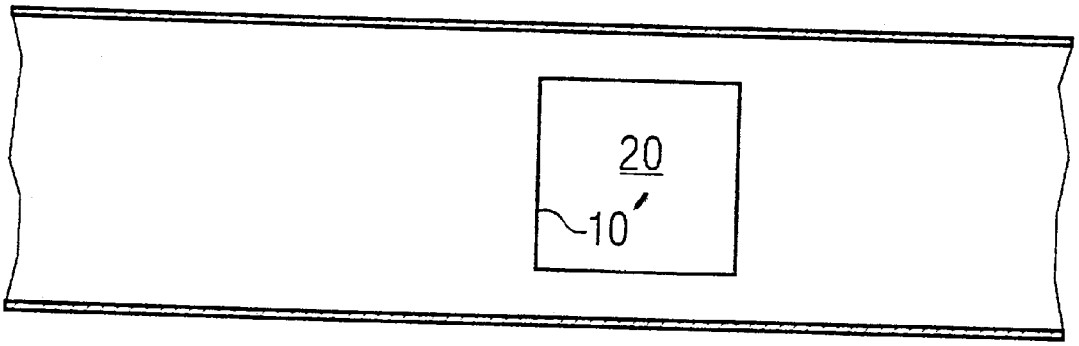

Shown in FIGS. 2a and 2b in an illustration corresponding to FIG. 1, is an alternative embodiment in which a projection 12 projects into the cavity and forms the cross-sectional discontinuity 10' at its distal end. It is possible thereby to achieve additional advantages by means of interference, the possibility of production no longer being quite so simple, however, as in the case of the embodiment shown in FIG. 1. Although in the embodiment illustrated the projection 12 is substantially aligned with the duct wall, an oblique position is also possible in this regard, for example pointing downwards into the cavity, or also upwards into the volume of the air duct.

Figure 3:
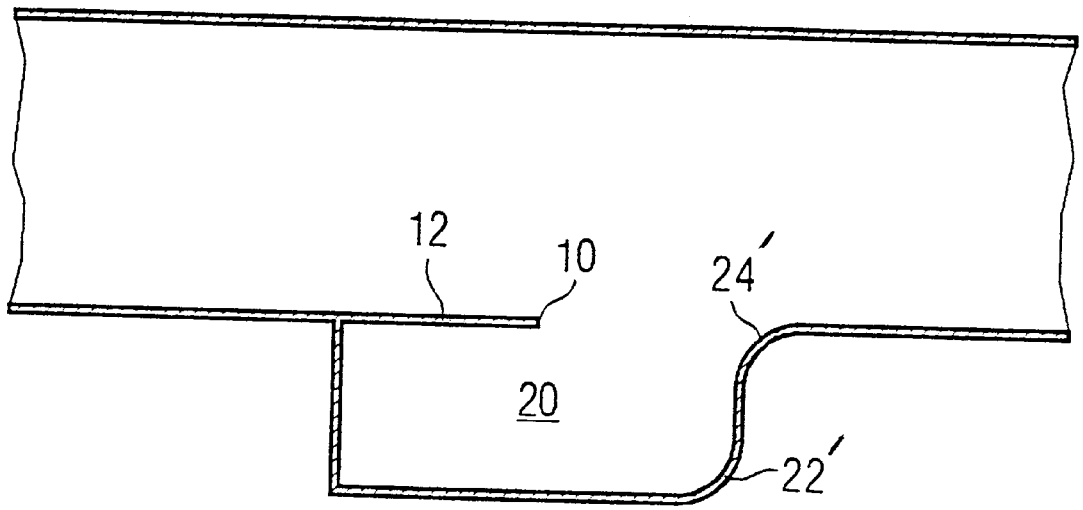
FIG. 3 shows a further design variant in an illustration corresponding to the top part of FIG. 2.

The embodiment shown in FIG. 3 differs from that shown in FIG. 2 in that the downstream end of the cavity 20 has been optimized with reference to the avoidance of turbulence by providing rounded transitions 22', 24'. The person skilled in the art will recognize that appropriate roundings are also possible at the cross-sectional discontinuity, said roundings being optimized with reference to turbulence, sound pressure and frequency spectrum without there being a need, however, to delimit it to a specific frequency, as has been the case to date with Helmholtz resonators.

Figure 4:
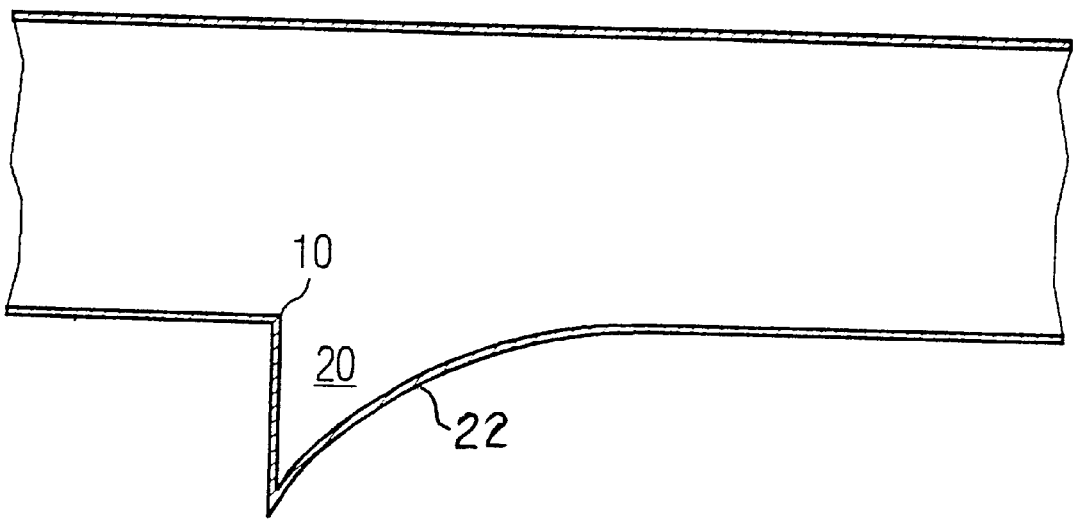
FIG. 4 shows a further development of the air duct shown in FIG. 1 in a sectional view similar to the top part of FIG. 1.

FIG. 4 shows, in a view similar to the upper half of FIGS. 1–3, an air duct which has been further developed and in which the wall 22 is of arcuate construction, in order to effect deflection of the air back to the duct 10.

As illustrated, the bottom wall merges continuously into the duct wall, in order to prevent eddying of the air guided in the air duct.

Figure 5A:
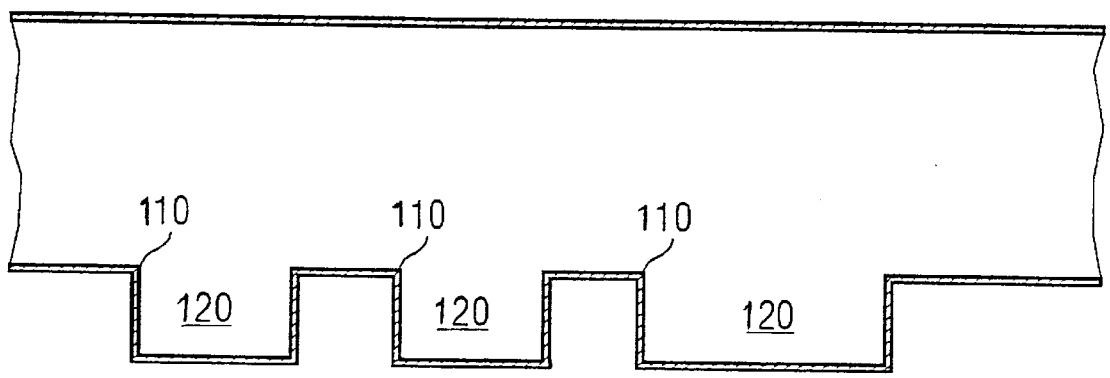
FIGS. 5a and 5b show, finally, in illustrations similar to FIGS. 1a and 1b an air duct as a further developed preferred embodiment as an exemplary combination of the embodiments shown in FIGS. 1 and 2.
Figure 5B:
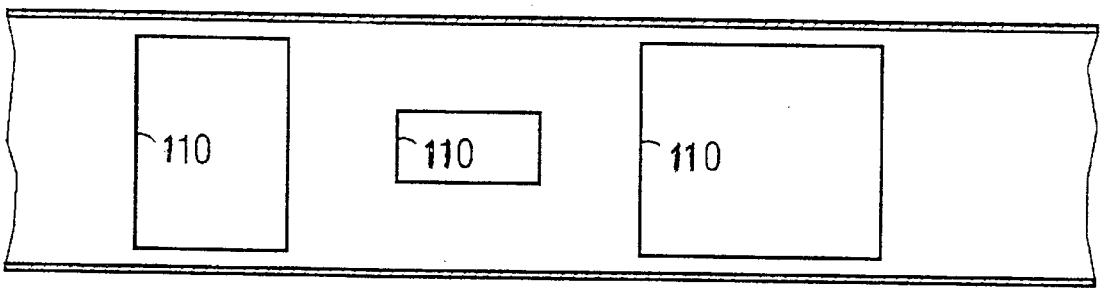

Finally, FIGS. 5a and 5b illustrate an embodiment combining the concepts of FIGS. 1 and 2. Three cross-sectional discontinuities 110 are each constructed with a downstream cavity 120 in the air duct of FIGS. 5a and 5b. As is clearly to be seen, the first and the third cross-sectional discontinuities have essentially the same width, as the cavities 120 following thereupon are of different length. The intermediate cross-sectional discontinuity 110 is of narrower construction, but has a following cavity 120 of the same length as the first cavity 120. As is clearly to be seen, it is thereby possible to use any desired combination of cross-sectional discontinuities and cavity geometries, in order to reduce individual broadband regions of the frequency spectrum.

Although the present invention has been described above completely with reference to exemplary embodiments, the person skilled in the art should recognize that the most varied changes and modifications are possible within the scope of the claims. In particular, it should be recognized that features of one embodiment can be combined at will with features of other embodiments. The invention is also not limited to a specific geometry of the duct cross section. The interaction between cross-sectional discontinuity—cavity—leading edge/surface can be changed variously, both with reference to the geometry of each individual part and with reference to the respective spacing.

It may be stated in summary that, contrary to the attempts so far to construct a duct wall as uniformly as possible, the present invention surprisingly permits an acoustic improvement of the air duct by the provision of at least one cross-sectional discontinuity.

What is claimed is:

1. An air duct in at least one of a motor vehicle heating, ventilating and air conditioning system, said air duct defining a longitudinal direction, said air duct comprising:

at least one cross-sectional discontinuity (10) in the air duct, said cross-sectional discontinuity defining a first length parallel to said longitudinal direction, and a straight wall opposite said at least one cross-sectional discontinuity (10), said straight wall extending a second length parallel to said longitudinal direction, wherein said second length is greater than said first length.

2. Air duct according to claim 1, wherein the cross-sectional discontinuity (10) is formed by a cross-sectional enlargement of the air duct.

3. Air duct according to claim 1, wherein the cross-sectional discontinuity (10) is constructed as an edge of a cavity (20) bordering the air duct.

4. Air duct according to claim 1, wherein the cross-sectional discontinuity (20) is constructed as a projection (12) which projects into a cavity (20) bordering and opening into the air duct.

5. Air duct according to claim 1, wherein the cross-sectional discontinuity is constructed substantially in a mid-section of a wall of the air duct.

6. Air duct according to claim 1, wherein the cross-sectional discontinuity (20) extends over at least 50% of a width of the air duct.

7. Air duct according to claim 3, wherein the edge of the cross-sectional discontinuity (20) is of rounded construction.

8. Air duct according to claim 1, wherein a plurality of cross-sectional discontinuities (10) are provided which are of different width, of different construction and/or with a bordering cavity (20) which is differently dimensioned/constructed.

9. Air duct according to claim 1, wherein an inlet end and an outlet end of the air duct have substantially the same cross section.

10. Air duct according to claim 9, wherein said at least one cross-sectional discontinuity defines an enclosed area of enlarged volume along a flow path of said air duct between said inlet and outlet ends.

11. Air duct according to claim 1, wherein said at least one cross-sectional discontinuity (10) in the air duct is formed with a duct wall extending substantially perpendicular to a flow direction in the air duct.

* * * * *